G. W. LUCE & G. C. VAN DYKE.
BALL COCK VALVE.
APPLICATION FILED APR. 15, 1912.

1,044,403.

Patented Nov. 12, 1912.

Witnesses;
F. E. Maynard.
E. B. Bru.

Inventors
George W. Luce
George C. Van Dyke,
By G. H. Strong.
his Atty

UNITED STATES PATENT OFFICE.

GEORGE W. LUCE AND GEORGE C. VAN DYKE, OF HAYWARD, CALIFORNIA.

BALL-COCK VALVE.

1,044,403.

Specification of Letters Patent. Patented Nov. 12, 1912.

Application filed April 15, 1912. Serial No. 690,967.

*To all whom it may concern:*

Be it known that we, GEORGE W. LUCE and GEORGE C. VAN DYKE, both citizens of the United States, residing at Hayward, in the county of Alameda and State of California, have invented new and useful Improvements in Ball-Cock Valves, of which the following is a specification.

This invention relates to ball cocks for tanks.

It is the object of the present invention to provide a valve automatically closable by the rising level of water in a tank, reservoir or other receptacle, and particularly to provide a valve automatically operable to close; the valve being so designed that the flow of water may run at full discharge capacity until the level designed to be obtained is reached, at which time the valve will rapidly and automatically close to cut off the supply of water.

As at present constructed, many valves controlling the filling of tanks are so constructed and so operate that when the tank has been exhausted, the supply pipe is opened by the valve and water enters the tank; the valve remaining open until such a time as the desired quantity of water has collected in the tank. In the common type of valve the mechanism is so constructed that it begins to shut off the flow of water at a considerable time before the desired quantity has been admitted to the tank, and the disagreeable effect of the gradual closing of the valve is the sound of escaping water, as it forces its way through the gradually closing valve. It is for the purpose of avoiding this disagreeable condition and operation of ball cock valves that the present invention is devised.

The invention consists of the parts and the construction and combination of parts as hereinafter more fully described and claimed, having reference to the accompanying drawings, in which—

Figure 1:
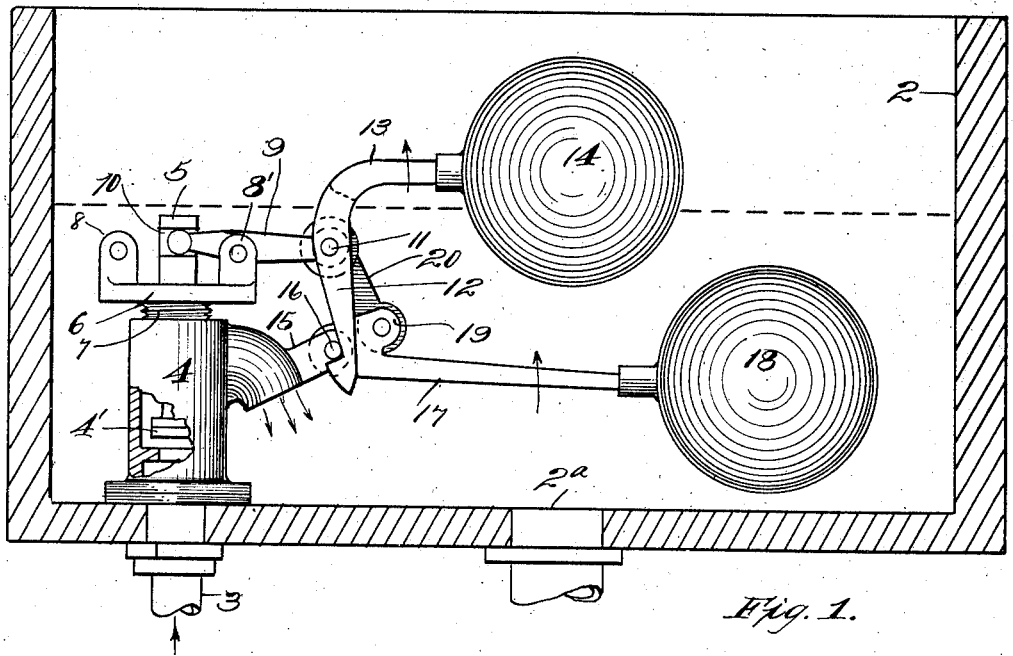
Figure 2:
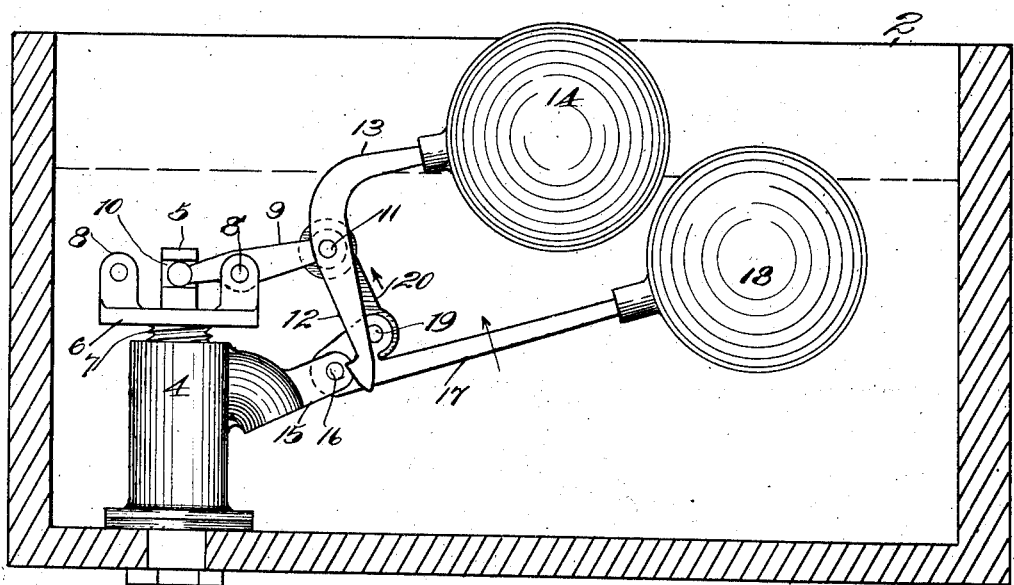

Figure 1 is a side elevation of the valve structure as mounted in a tank, the valve being open. Fig. 2 is a similar view in partial section, the valve being closed.

In the illustrated embodiment of the invention 2 represents a tank or other suitable receptacle adapted to be filled with water to a certain level through a supply connection 3 appropriately attached to the tank and to which is connected inside the tank a valve 4, over the seat of which is closable a valve disk 4' of suitable construction. The valve disk 4' is connected to and operated by a stem 5 guided in a bushing or gland 6 externally threaded, as at 7, to be adjusted in the valve 4. The gland 6 is provided with diametrically opposite bearing lugs 8—8', and in one of these is pivoted a lever 9 of the first order, the inner end of which is mounted in a slot 10 in the valve stem 5. At the outer end of the lever 9 is a pivot 11, upon which is mounted a fork-shaped pawl 12, the upwardly extending arm 13 of which is provided with a float 14.

Projecting to and on one side of the valve 4 is a bearing 15, through which projects a pin or other device 16, upon which is fulcrumed the arm 17 of a float 18; the arm being formed in the shape of a lever with a short arm 19 extending upwardly and outwardly from the valve 4. The short arm 19 of the float lever 17 is connected by a link 20 to the pivot 11 of the lever 9, and on which pivot the float lever 13 is mounted.

When the water is discharged from the tank 2 through the drain opening $2^a$, the floats 18 and 14 are permitted to move, as the water level falls, to a position shown in Fig. 1. When the discharge aperture $2^a$ is closed and water begins to rise in the tank, the lower float will remain stationary after the lock shoulders of the pawl have engaged the pin 16, thus locking the float in its lowermost position, as shown in Fig. 1. The float 18 cannot rise to lift the fulcrum 11 on the lever 9 by reason of the connection or link 20 to the lever arm 19, until the water rises sufficiently to lift the float 14 and disengage said lock shoulders from the pin, which is effected as follows: When the locking pawl 12 has engaged the transverse pin 16 to prevent the operation of the links and levers of the device, the position of the valve stem 5 with its head 4' will be such relative to the seat of the valve 4 that a full supply of water is flowing rapidly into the tank without noise and the filling of the tank proceeds silently, until such a time when the necessary or desired volume of water has been collected in the tank 2, and then the pressure of the water on the secondary or auxiliary float 14 will be sufficient to swing the lever arm 13 about its fulcrum 11, and thus pull the pawl 12 from locking engagement with the transverse pin 16, at which moment, due to the release of the lever mechanism, the float 18 will operate to lift the lever 9 about its fulcrum 8 and instantly close the valve cutting off the flow of water noiselessly.

The purpose of the adjustable gland 6 in the valve 4, is to permit the adjustment of the elevation of the bearings 8—8', and the lever 9 pivoted on one of said bearings relative to the bottom of the tank, so as to control the level of water at which the pawl 12 becomes released from the pin 16. By giving the gland 6 one-half turn, manifestly the elevation of the fulcrums 8—8' will be increased or decreased, according to the direction in which the gland is turned.

An advantage of the present valve is that the chance of the valve becoming ineffective as a complete closure because of particles of foreign matter jamming in the valve seat is removed, because the valve seat does not gradually close allowing a small stream to pass the disk and thus act as a strain; the present valve disk remains wide open until released and then quickly seats and does not act as a gradually closing screen.

Having thus described our invention, what we claim and desire to secure by Letters Patent is—

1. The combination with a liquid receptacle, of a valve adapted to remain open to allow a free discharge of water into the tank until the desired quantity has been accumulated in the tank, and means operative to instantly close the valve when the desired quantity of water has been collected, said means including a lever connected to a movable part of the valve, a primary float operatively connected to said lever, a locking device mounted on the lever adapted to lock the lever from movement when the valve is closed and when the receptacle is practically discharged; a secondary float, said secondary float being adapted to release the locking device instantaneously when the desired quantity of water has accumulated, and permitting the primary float to close the valve.

2. The combination with a liquid receptacle, of means controlling the supply of liquid to the receptacle, said means including a valve having a movable part and its stem, an adjustable gland in which the stem is reciprocable, a lever fulcrumed upon said gland and operably connected to the stem, a mechanism for holding the valve in full open position during the admission of water to the receptacle, a float operably connected to said means and adapted to release the same when the desired volume of water has accumulated, and a float connected to said lever and adapted to operate the same to close the valve instantly when the locking mechanism is released.

In testimony whereof we have hereunto set our hands in the presence of two subscribing witnesses.

GEORGE W. LUCE.
GEORGE C. VAN DYKE.

Witnesses:
J. J. THORNY,
R. K. NISSEN.

Copies of this patent may be obtained for five cents each, by addressing the "Commissioner of Patents, Washington, D. C."